US005274317A

United States Patent [19]
Utley et al.

[11] Patent Number: 5,274,317
[45] Date of Patent: Dec. 28, 1993

[54] SINGLE SENSOR CURRENT CONTROL OF A MULTIPLE PHASE AC MACHINE

[75] Inventors: Daniel E. Utley, Anderson; Kevin M. Deasy, Noblesville; Gordon D. Cheever, Jr., Kokomo, all of Ind.

[73] Assignees: General Motors Corp., Detroit, Mich.; Delco Electronics Corporation, Kokomo, Ind.

[21] Appl. No.: 974,761

[22] Filed: Nov. 12, 1992

[51] Int. Cl.⁵ .................................... H02P 5/40
[52] U.S. Cl. .......................... 318/802; 318/811; 318/806; 318/798
[58] Field of Search ............ 318/767, 432, 798, 811, 318/799, 802, 806, 810

[56] References Cited

U.S. PATENT DOCUMENTS

| | | | |
|---|---|---|---|
| 4,041,361 | 8/1977 | Cornell | 318/432 |
| 4,489,267 | 12/1984 | Saar et al. | 318/811 |
| 4,599,550 | 7/1986 | Robertson, Jr. et al. | 318/811 |
| 4,739,240 | 4/1988 | MacMinn et al. | 318/696 |
| 4,885,518 | 12/1989 | Schauder | 318/807 |
| 5,038,092 | 8/1991 | Asano et al. | 318/806 |

OTHER PUBLICATIONS

*Automotive Design Engineering*, "Sine Wave Generation for Electric Vehicle AC Motor Drive", by Jeff Baum & Ken Berringer, pp. 326-330, 1992.

*Primary Examiner*—William M. Shoop, Jr.
*Assistant Examiner*—John W. Cabeca
*Attorney, Agent, or Firm*—Mark A. Navarre

[57] ABSTRACT

An improved digital PWM closed-loop current control for a multiple phase winding AC machine which requires only a single sensor for monitoring the current in one of the phase windings of the machine. The PWM on-time values for the various phase windings of the machine are stored in a single look-up table as a function of stator position and requested current amplitude, and the on-times used to schedule phase winding energization are periodically updated using a two-part look-up procedure. Initially, the stored on-time value for a single phase winding is retrieved from the table as a function of stator position and the requested current amplitude. The retrieved value is then compared with a measure of the actual current in the respective phase winding to form an error signal, which is used to adjust the requested current amplitude. The requested current amplitude, as adjusted, is then used, along with the stator position, as a table look-up parameter to retrieve PWM on-times for all three phase windings, thereby automatically adjusting multiple phase winding currents in a balanced fashion.

3 Claims, 9 Drawing Sheets

| SINEWAVE #1 | SINEWAVE #2 | 0 | 0 | 0 | 0 | 0 | 0 | 0 | 0 | SINEWAVE #3 |
|---|---|---|---|---|---|---|---|---|---|---|
| 0 0 0 0 0 0 0 0 | SINEWAVE #1 | SINEWAVE #2 | | | | | | | | 0 0 0 0 0 0 0 0 |
| 0 0 0 0 0 0 0 0 | SINEWAVE #1 | 0 | 0 | 0 | 0 | 0 | 0 | 0 | 0 | SINEWAVE #2 |
| 0 0 0 0 0 0 0 0 | SINEWAVE #2 | 0 | 0 | 0 | 0 | 0 | 0 | 0 | 0 | SINEWAVE #1 |

SINGLE SENSOR CURRENT CONTROL OF A MULTIPLE PHASE AC MACHINE

This invention relates to a digital control for a multiple phase winding AC machine in which the phase winding currents are controlled based on the current measured in a single phase winding.

BACKGROUND OF THE INVENTION

Operating an AC machine from a DC power source typically requires the use of a solid state inverter for establishing a rotating magnetic field in the stator of the machine. To reduce motor losses, the switching devices of the inverter are generally pulse-width-modulated (PWMed) at a relatively high frequency (such as 20 kHz) so that the current supplied to the stator windings is substantially sinusoidal. Traditionally, this is achieved with discrete digital and/or analog circuit elements, such as reference sine and triangle-wave generators and comparators.

More recently, there hall been a trend toward the use of micro-processor based controllers, in which the PWM on-times for each phase winding are stored in non-volatile memory as a function of rotor position and requested current amplitude. A co-pending U.S. patent application Ser. No. 07/975,295, filed Nov. 12, 1992, and assigned to the assignee of the present invention, is directed to such a system, based on a multi-processor micro-controller architecture such as the MC68332 manufactured by Motorola Inc., Phoenix Ariz.

A micro-processor based current control may be performed either open-loop or closed-loop. In open-loop control, the inverter switching devices are simply switched in accordance with the stored PWM on-times, as shown in the above-referenced U.S. patent application Ser. No. 07/975,295. In closed-loop control, the currents in the various phase windings are individually measured and provided as feedback for comparison with respective phase current commands. Each comparison yields an error signal, which in turn, is used to effect real-time adjustment of the PWM on-times so that the measured currents are brought into correspondence with the current commands.

Closed-loop control can be significantly more accurate than simple open-loop control, but typically requires the use of separate current sensors for the different phase windings of the machine. With certain winding configurations, one sensor may be omitted since the current in the respective phase winding may be inferred by Kirchhoff's current law.

SUMMARY OF THE PRESENT INVENTION

The present invention is directed to an improved digital closed-loop current control for a multiple phase winding AC machine which requires only a single sensor for monitoring the current in one of the phase windings of the machine. As in the above-identified Ser. No. 07/975,295, the PWM on-time values for each of the phase windings of the machine are stored in a single look-up table as a function of stator position and requested current amplitude, and new PWM on-time values are periodically retrieved for the generation of PWM control signals for the inverter switching devices.

According to this invention, however, the retrieval of new PWM on-time values is carried out in a two-part look-up procedure. Initially, the stored on-time value for a single phase winding is retrieved from the table as a function of stator position and the requested current amplitude. The retrieved value, which may be viewed as an instantaneous current command for the respective phase winding, is then compared with a scaled measure of the actual current in that phase winding to form an error signal. The requested current amplitude is then adjusted in relation to the error signal and used, along with the stator position, as a table look-up parameter to retrieve a set of PWM on-time values for all of the phase windings, thereby automatically adjusting multiple phase winding currents in a balanced fashion.

In the preferred embodiment, the control of this invention is carried out with a micro-controller including a host processor for carrying out the PWM on-time look-up functions, and a timer processor which operates in parallel with the host processor to develop the PWM control signals for the inverter switching devices.

BRIEF DESCRIPTION OF THE DRAWINGS

FIGS. 3a–3h graphically depict representative waveforms generated by the timer processor of FIG. 1.

FIGS. 5a–5b depict flow diagrams representative of computer program instructions executed by the timer processor of FIG. 1 in the generation of the waveform of FIG. 3a.

DETAILED DESCRIPTION OF THE DRAWINGS

Figure 1:
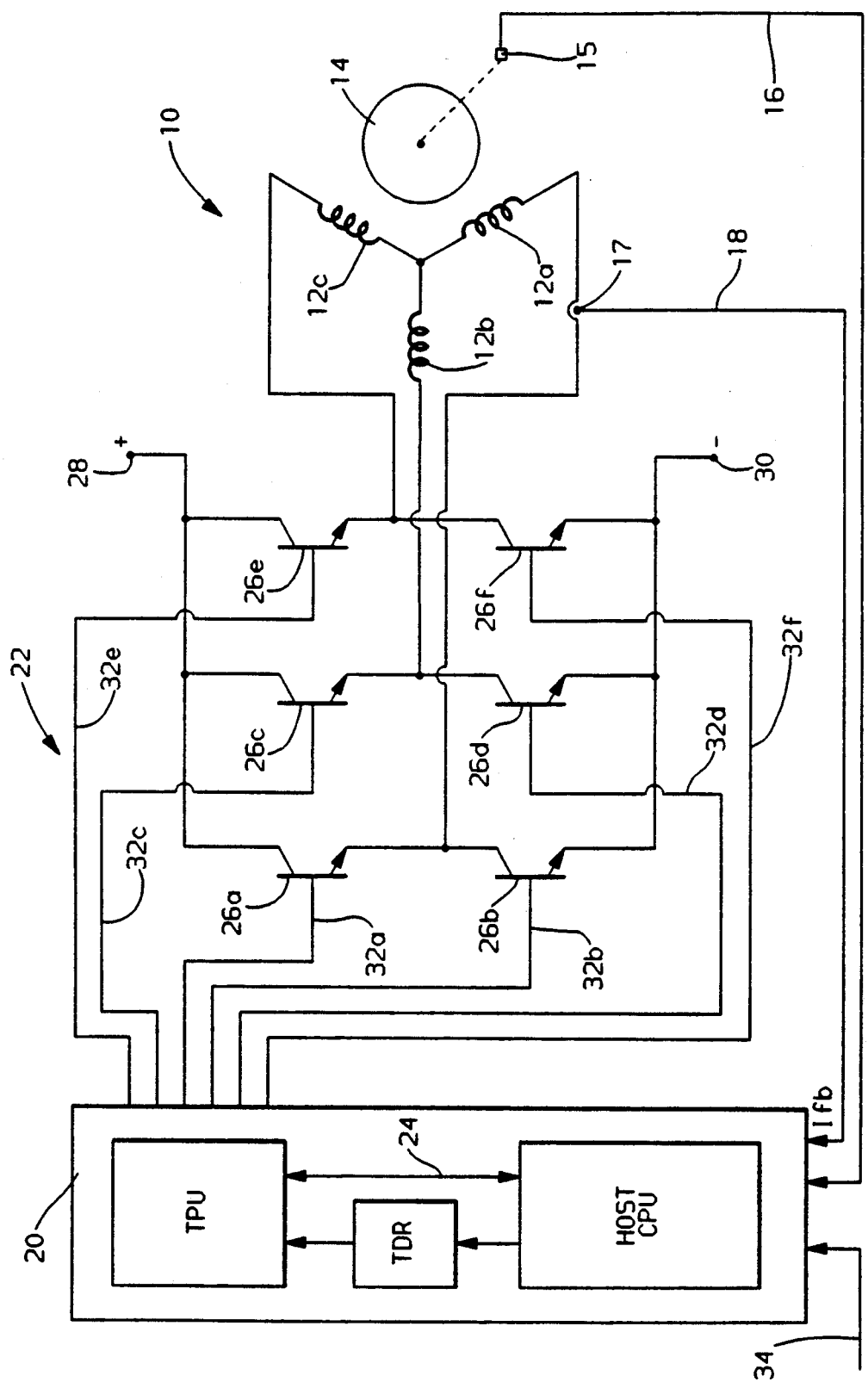
FIG. 1 is a system diagram schematically depicting an inverter, an AC machine and a microcontroller including a host processor, a timer data register and a timer processor.

Referring to FIG. 1, the reference numeral 10 generally designates a three-phase AC induction machine having WYE-connected stator phase windings 12a, 12b and 12c, and a shorted turn rotor 14. An encoder 15 mechanically coupled to rotor 14 provides periodic electric pulses on line 16 at a frequency based on rotor displacement, and a current sensor 17 coupled to the phase winding 12a provides a phase current feedback signal Ifb on line 18.

The stator phase windings 12a–12c are energized with electric current by a control system comprising a micro-controller 20 and full-wave inverter 22. The inverter 22 comprises six power transistors 26a–26f, and is connected to a DC voltage source (not shown) as indicated by the + and − designations at terminals 28 and 30, respectively. The transistors 26a–26f are individually turned on and off by micro-controller 20 as explained below via control signal lines 32a–32f.

The micro-controller 20, which may be a Motorola MC68332 or equivalent, comprises in pertinent part a Host Central Processor Unit (HOST CPU), a Timer Processor Unit (TPU) and a Timer Data Register (TDR). Bi-directional communication between the HOST CPU and the TPU is achieved via bus 24. As explained in further detail below, the HOST CPU periodically retrieves PWM on-time values for each motor phase from an external nonvolatile memory (not shown), and stores the same in the TDR for transfer to the TPU, which in turn, develops the PWM control signals PWM1, PWM2 and PWM3 for inverter transistors 26a-26f.

The TPU includes several timer channels, and the HOST CPU configures four of the channels for the development of dual-edged synchronized PWM control signals for the inverter transistors of each motor phase, as explained below. One channel (CH0) is configured to develop a synchronization (SYNC) signal, and three other channels (CH1, CH2, CH3) are configured to develop the control signals for the three motor phases.

Phase-specific conduction periods, or on-times, referred to herein as HIGHTIME1, HIGHTIME2 and HIGHTIME3, for producing substantially sinusoidal phase winding current in the three-phase machine of FIG. 1 are stored in a three-dimensional look-up table as a function of the requested current AMPLITUDE and a signal (STATOR ANGLE) representative of the desired phase-lead or phase-lag of the magnetic field created by the stator windings 12a-12c relative to the rotor 14. Conveniently, one look-up retrieves conduction period data for all three phase windings 12a-12c.

Figure 2:
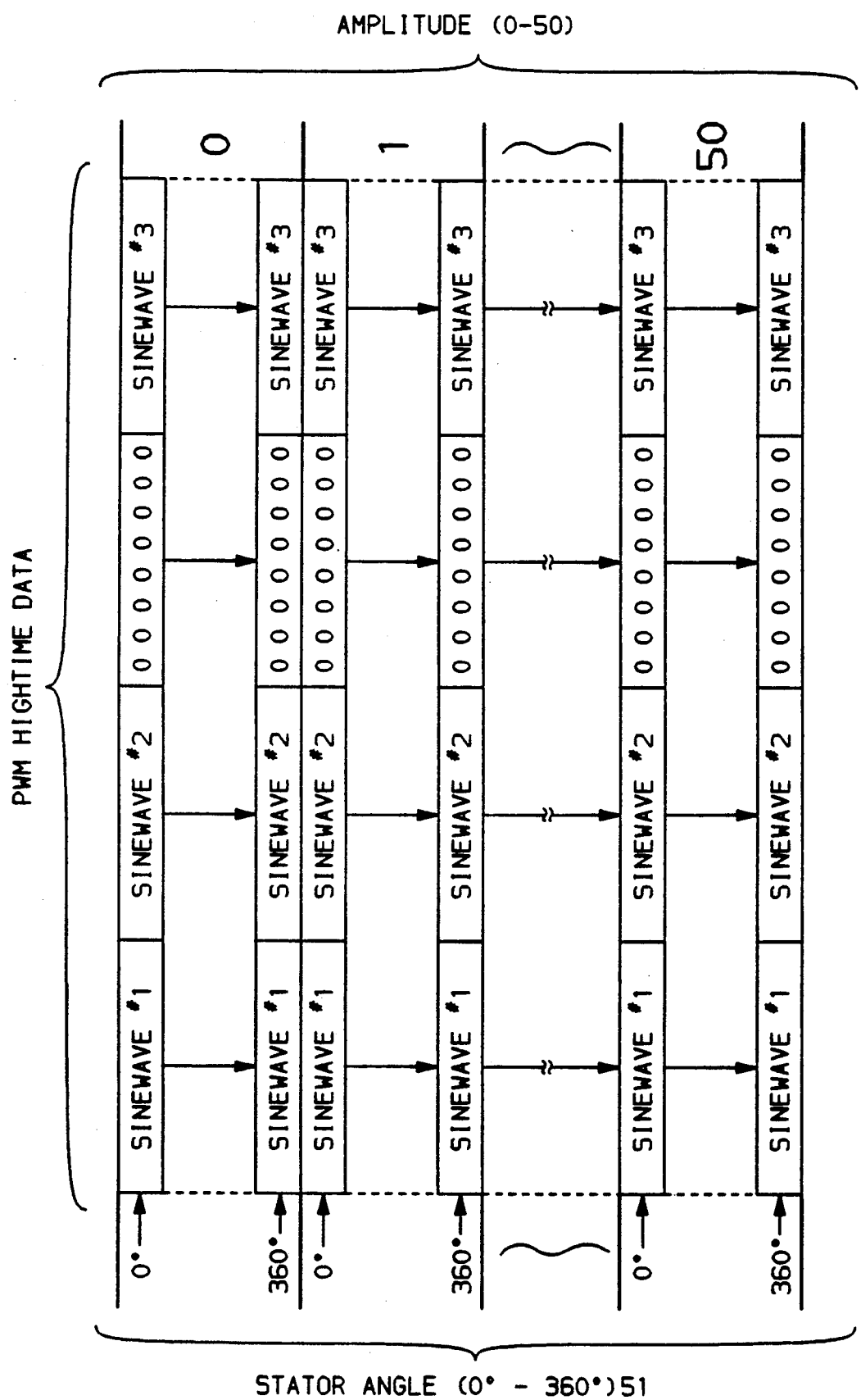
FIG. 2 schematically depicts a nonvolatile look-up table accessible by the microcontroller of FIG. 1.

As indicated above, the table of PWM on-time values physically resides in a nonvolatile memory. A schematic representation of such a table for the illustrated embodiment is depicted in FIG. 2, where three phase-specific PWM on-time values are stored for each degree of STATOR ANGLE (0-360) and each AMPLITUDE level (0-50). The independent variables of STATOR ANGLE and AMPLITUDE are depicted on the left and right sides of the Figure, respectively. On-time values for STATOR ANGLE and AMPLITUDE intermediate the discrete levels may be obtained by interpolation if desired.

The base AMPLITUDE value is primarily determined in response to a demand signal on line 34, which may be a motor/generator torque command. If the machine 10 is utilized as an automotive starter/generator, for example, the demand input may be based on parameters such as engine throttle position, brake effort, etc. The STATOR ANGLE signal is determined as a combined function of the rotor position information ROTPOS provided by encoder 15 and the desired slip SLIP of the machine. The magnitude of the SLIP may be varied with motor speed, while its sign depends on whether the machine is operating as a motor or a generator.

The PWM on-time values stored in the table of FIG. 2 effectively represent instantaneous phase winding current commands, and are chosen to produce substantially sinusoidal current having an amplitude corresponding to the requested current AMPLITUDE. However, closed-loop control of the current actually supplied to the phase windings 12a-12c is sometimes required to achieve accurate and repeatable motor control. This is achieved, according to this invention, by developing a single error term based on the current measured in one of the phase windings, phase winding 12a in the illustrated embodiment.

The error term is formed by suitably scaling the measured current, and comparing it with the result of a first look-up of the PWM on-time value for phase winding 12a, based on the requested current AMPLITUDE and STATOR ANGLE. The error term is then applied to the requested current AMPLITUDE to form a closed-loop amplitude term, AMPLITUDE', which is used, along with STATOR ANGLE, in a second table look-up of the PWM on-time values. These values, in turn, are used to update the TDR so that the PWM control signals generated by the TPU are developed in accordance with the results of the second look-up.

Figure 3A:
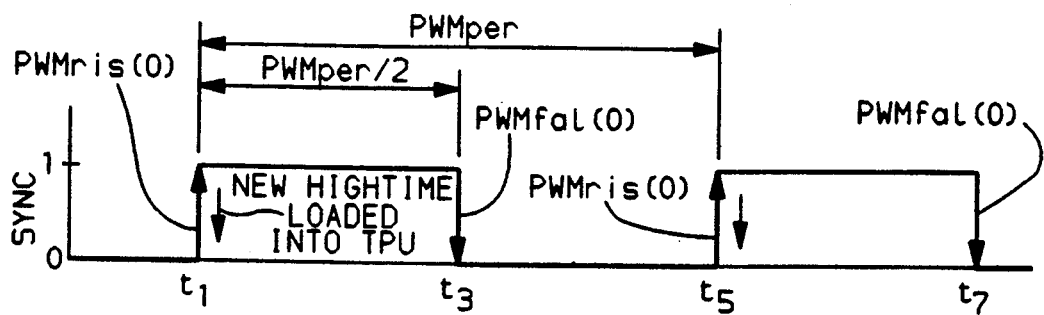
Figure 3B:
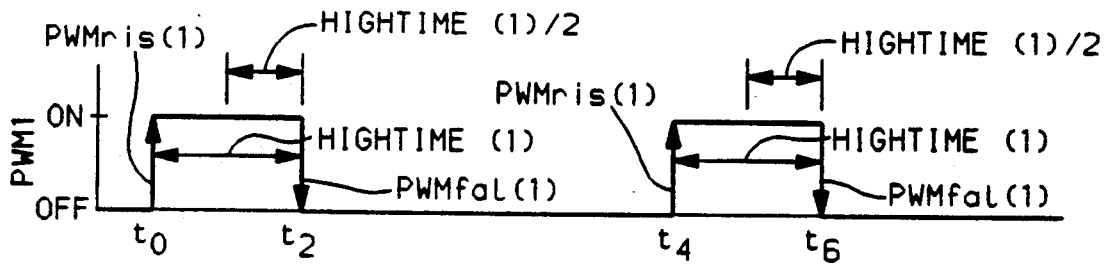

A mechanization of the above-described control with the system of FIGS. 1-2 will now be described. FIGS. 3a and 3b respectively depict a synchronization SYNC signal developed by timer channel CH0 and a PWM control signal (PWM1) developed by timer channel CH1, on a common time base. The channel CH0 of FIG. 3a is configured by the HOST CPU so that the SYNC signal has a 50% duty cycle at the PWM period PWMper. Consequently, the SYNC signal has a rising or leading edge, designated as PWMris(0), at the beginning of each PWM period, and a falling or trailing edge, designated as PWMfal(0), at the midpoint of the PWM period. These logic level transitions are used by the TPU to trigger updating of the on-time data by the HOST CPU and to synchronize the development of the PWM control signals PWM1, PWM2 and PWM3 so that they are centered about PWMris(0).

At each occurrence of PWMris(0), time t1 for example, the TPU interrupts the HOST CPU to initiate updating of the on-time data stored in the TDR, and to compute the timing of the next two logic level transitions PWMfal(0) and PWMris(0), respectively. This functionality is detailed in the flow diagrams of FIGS. 4b, 4c and 4e. The updated on-time data and the computed timing of PWMris(0) are then used by the TPU at the logic level transitions of each PWM control signal to compute the timing of the next respective logic transition; this functionality is detailed in the flow diagrams of FIGS. 6a-6c.

Referring to FIGS. 3a-3b, for example, the TPU is interrupted at time t1—PWMris(0)—to compute the time t3 of the falling edge PWMfal(0) and the time t5 of the next rising edge PWMris(0). With respect to channel CH1, the TPU is interrupted once at time t2—PWmfal(1)—to compute the time t4 of the next rising edge PWMris(1) based on HIGHTIME1 and the computed time t5, and again at time t4—PWMris(1)—to compute the time t6 of the next falling edge PWMfal(1), again based on HIGHTIME1 and the computed time t5.

Figure 4A:
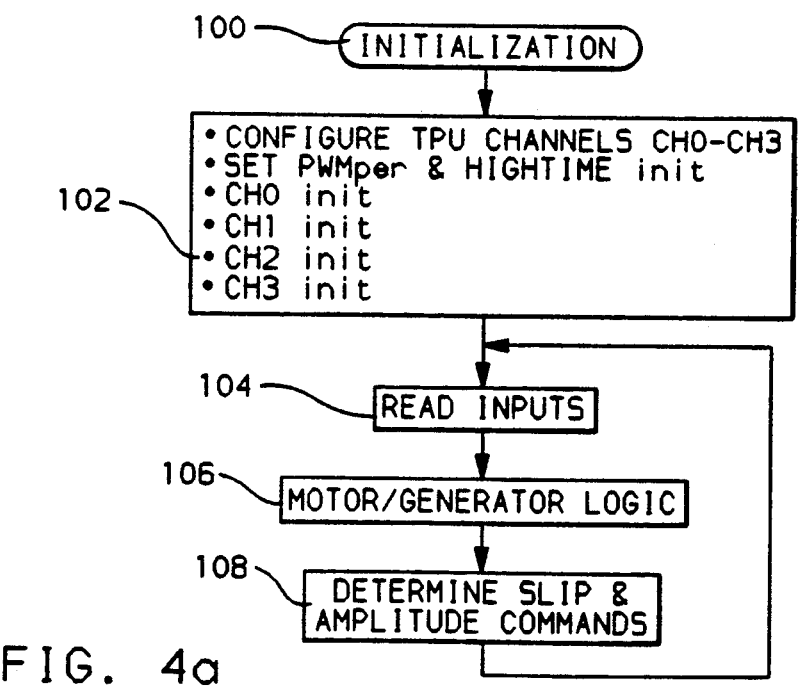
FIGS. 4a, 4b, 4c and 4e depict flow diagrams representative of computer program instructions executed by the host processor.

As indicated above, the flow diagrams of FIGS. 4a-4c, 4e, 5a-5b and 6a-6c represent computer program instructions executed by the HOST CPU and the TPU in carrying out the waveform generation described in reference to FIGS. 3a-3b. FIG. 4a is a main loop flow diagram executed by the HOST CPU, including the TPU initialization and the determination of SLIP and AMPLITUDE. A service routine executed by the HOST CPU in response to periodic interrupts generated by the TPU for updating the TDR on-time data is depicted by the flow diagrams of FIGS. 4b, 4c and 4e, and the chart of FIG. 4d. The flow diagram of FIG. 4c details the data transfer from the TDR to the TPU, and the flow diagram of FIG. 4e details the closed-loop control of the present invention. The initialization and servicing of the TPU SYNC channel CH0 is detailed in the flow diagrams of FIGS. 5a-5b, while the initialization and servicing of a representative PWM control signal channel CH1 is detailed in the flow diagrams of FIGS. 6a-6c.

Referring to the HOST CPU main loop flow diagram of FIG. 4a, the initialization instruction blocks 100 and 102 are executed at each power-up of the micro-controller 20 to initialize certain variables and registers prior to executing the main program instructions. With respect to the TPU initialization at block 102, the HOST CPU sets the PWM period PWMper and initial on-time (HIGHTIMEinit), and initializes the TPU timer channels CH0–CH3, as designated by CH0init, CH1init, CH2init and CH3init. In the illustrated embodiment, the on-time is initialized at 50%, which corresponds to a condition of zero current flow in the phase windings 12a–12c. The timer channel configuration typically involves setting the period, hightime and synchronization registers for each channel.

Following initialization, the HOST CPU sequentially and repeatedly executes the instruction blocks 104–108, as well as various other unrelated control function blocks, not shown. The block 104 concerns the reading of various system inputs including the encoder signal on line 16, the phase winding current feedback signal Ifb on line 18, and the torque demand signal on line 34. As indicated with respect to FIG. 1, the motor torque demand signal may take the form of an engine throttle position signal in an automotive starter/generator system, for example.

The block 106 represents motor/generator logic which determines whether the machine 10 should be operating in the motoring or generating mode; in the automotive installation, this may be determined by monitoring the vehicle acceleration or application of the service brakes. The block 108 is directed to the determination of the AMPLITUDE and SLIP commands. As indicated above, the AMPLITUDE command is directly related to the demand signal input, while the SLIP command may be fixed, or determined in relation to the required torque or the desired power output of machine 10.

The execution of the main loop flow diagram of FIG. 4a is periodically interrupted in response to the generation of periodic interrupt requests by the TPU, as briefly discussed in reference to FIGS. 1 and 3a–3b. The interrupt request means that the TPU will soon need updated PWM on-time data, and the HOST CPU services the interrupt by executing the TPU INT flow diagram of FIGS. 4b, 4c and 4e. After clearing the TPU interrupt at block 110, the block 112 is executed to move the on-time data previously determined and stored in the TDR to the data registers of the PWM control signal timer channels CH0–CH3. This process involves a sequence of shift and transfer instructions, as detailed in the flow diagram of FIG. 4c and the associated chart of FIG. 4d.

Figure 4B:
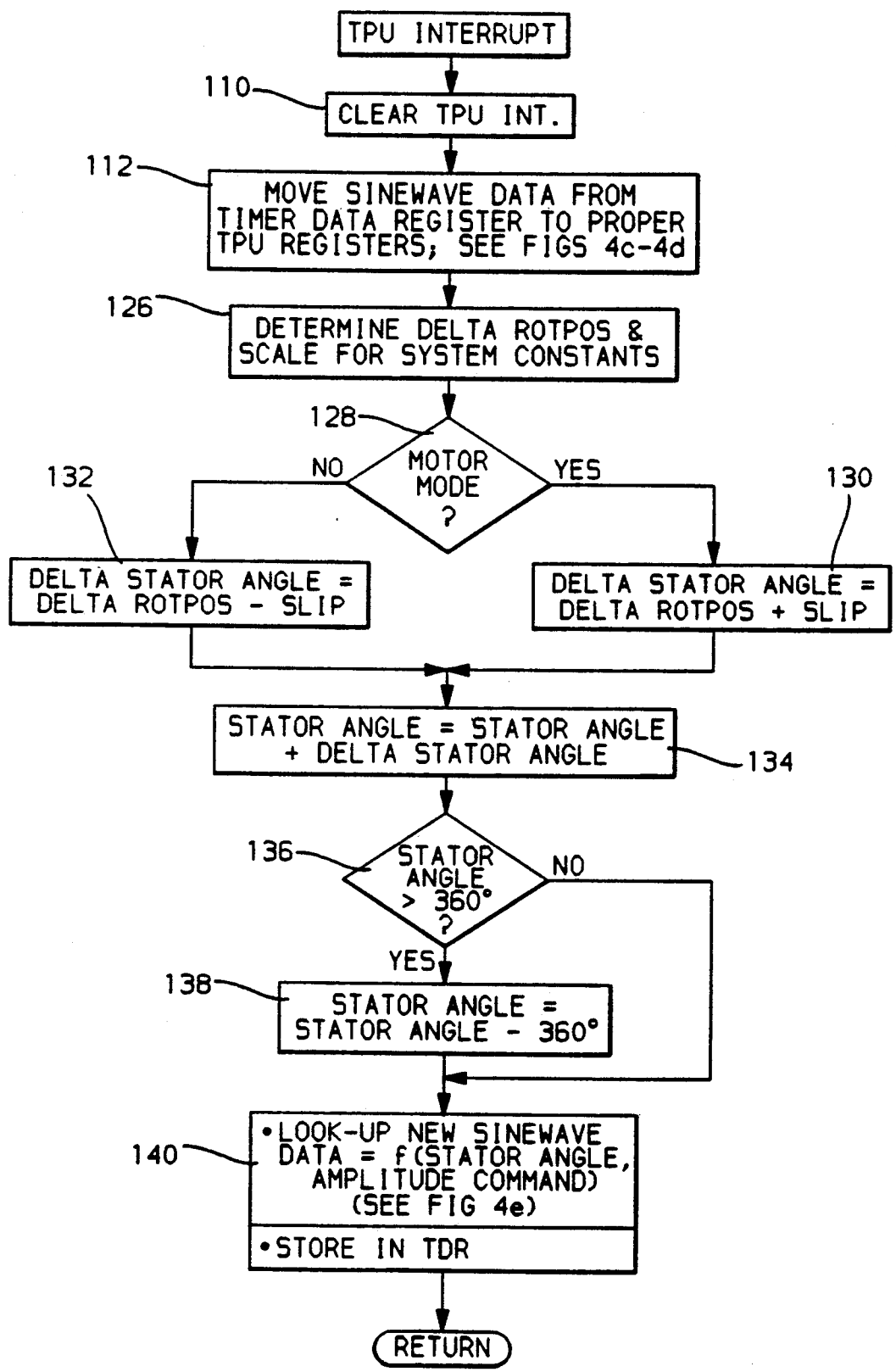
Figures 4C, 4D:
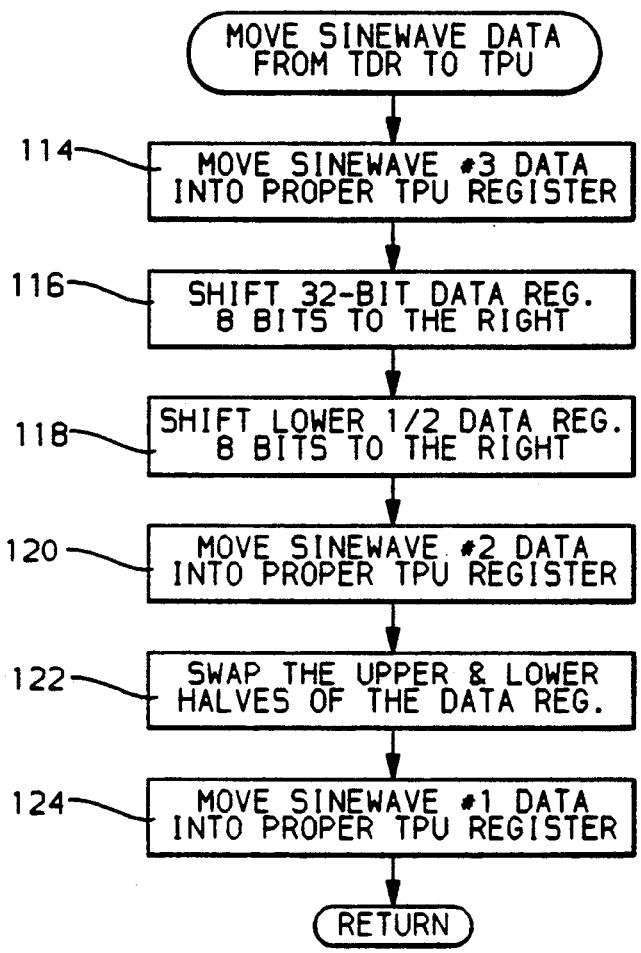
FIG. 4d is a schematic representation of PWM on-time data transfer from the timer data register to individual registers of the timer processor.

Referring to the top line of the chart of FIG. 4d, the TDR is 32 bits wide, accommodating four eight-bit bytes of on-time data. Since only three on-time data bytes are needed for the three-phase machine 10 of FIG. 1, one data byte is loaded with zeros as shown. First, as indicated by the blocks 114–116 and the second line of the chart, the on-time data for motor phase 3 is moved to the TPU timer channel CH3 and all of the TDR data is shifted eight bits to the right. Next, as indicated by the block 118 and the third line of the chart, the lower half of the TDR data is shifted eight bits to the right. Then, as indicated by the blocks 120–122 and the fourth line of the chart, the on-time data for motor phase 2 is moved to the TPU timer channel CH2, and upper and lower halves of the TDR data are swapped. Finally, as indicated by the block 124, the on-time data for motor phase 1 is moved to the TPU timer channel CH1, completing the data transfer.

Referring again to the TPU INT flow diagram of FIG. 4b, the HOST CPU then executes block 126 to determine the change in rotor position (DELTA ROTPOS) based on the time elapsed between successive pulses of the encoder signal on line 16 of FIG. 1, and to scale DELTA ROTPOS in accordance with a system calibration constant. This constant conveniently accounts for a number of system parameters including the clock frequency of micro-controller 20, the TPU interrupt frequency, encoder parameters, the number of machine poles, etc.

The blocks 128–132 are then executed to determine the required phase change of the stator winding energization, DELTA STATOR ANGLE. If the machine 10 is operating in a motoring mode, as determined at block 128, the block 130 is executed to determine the DELTA STATOR ANGLE according to the sum (DELTA ROTPOS +SLIP). If the machine 10 is operating in a generator mode, the block 132 is executed to determine the DELTA STATOR ANGLE according to the difference (DELTA ROTPOS −SLIP). The stator energization angle, STATOR ANGLE, is then determined at block 134 according to the sum (STATOR ANGLE +DELTA STATOR ANGLE). If the STATOR ANGLE is greater than 360 degrees, as determined at block 136, block 138 is executed to reduce the STATOR ANGLE by a full revolution, 360 degrees.

Figure 4E:
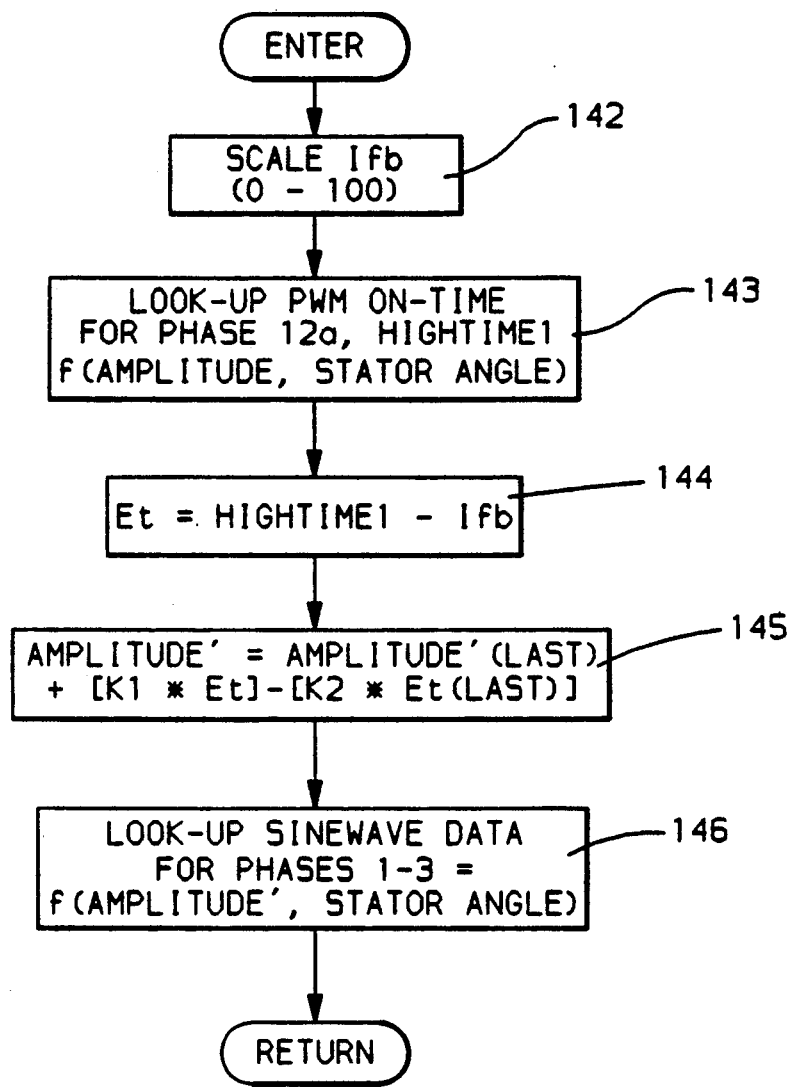

Once the STATOR ANGLE is determined, the block 140 is executed to determine the closed-loop on-time values for each of the three phases, and to store the values in the TDR. The on-time determination is detailed in the flow diagram of FIG. 4e, as indicated at block 140. Referring to FIG. 4e, the block 142 is first executed to scale the phase winding current feedback signal Ifb to a range compatible with the on-time data stored in the HOST CPU.

In the illustrated embodiment, the PWM on-time data is mapped into 101 discrete levels (0–100), and the block 142 serves to similarly scale Ifb. As indicated at block 143, the HOST CPU then retrieves the stored PWM on-time for phase winding 12a, designated HIGHTIME1, based on the determined STATOR ANGLE and the AMPLITUDE command. The error term Et is then determined according to the difference (HIGHTIME1 −Ifb), as indicated at block 144. Proportional and integral correction terms are then formed based on the determined error term Et, and applied to AMPLITUDE to form a closed-loop amplitude term, AMPLITUDE', as indicated at block 145. Algebraically, AMPLITUDE' is defined as:

$$AMPLITUDE' = AMPLITUDE'(LAST) + [K1*Et] - [K2*Et(LAST)]$$

where K1 and K2 are constants, AMPLITUDE' (LAST) is the closed-loop amplitude term from the previous TPU interrupt, and ET(LAST) is the error term from the previous TPU interrupt. Finally, as indicated at block 146, the HOST CPU retrieves an entire set of sinewave data (i.e., HIGHTIME1, HIGHTIME2, and HIGHTIME3) for the phase windings 12a–12c, based on the STATOR ANGLE and the closed-loop amplitude term, AMPLITUDE'. This data is then stored in the TDR, as indicated in the bottom part of block 140, for transfer to the PWM control signal timer channels CH1-CH3 in the next TPU interrupt.

Figure 5A:
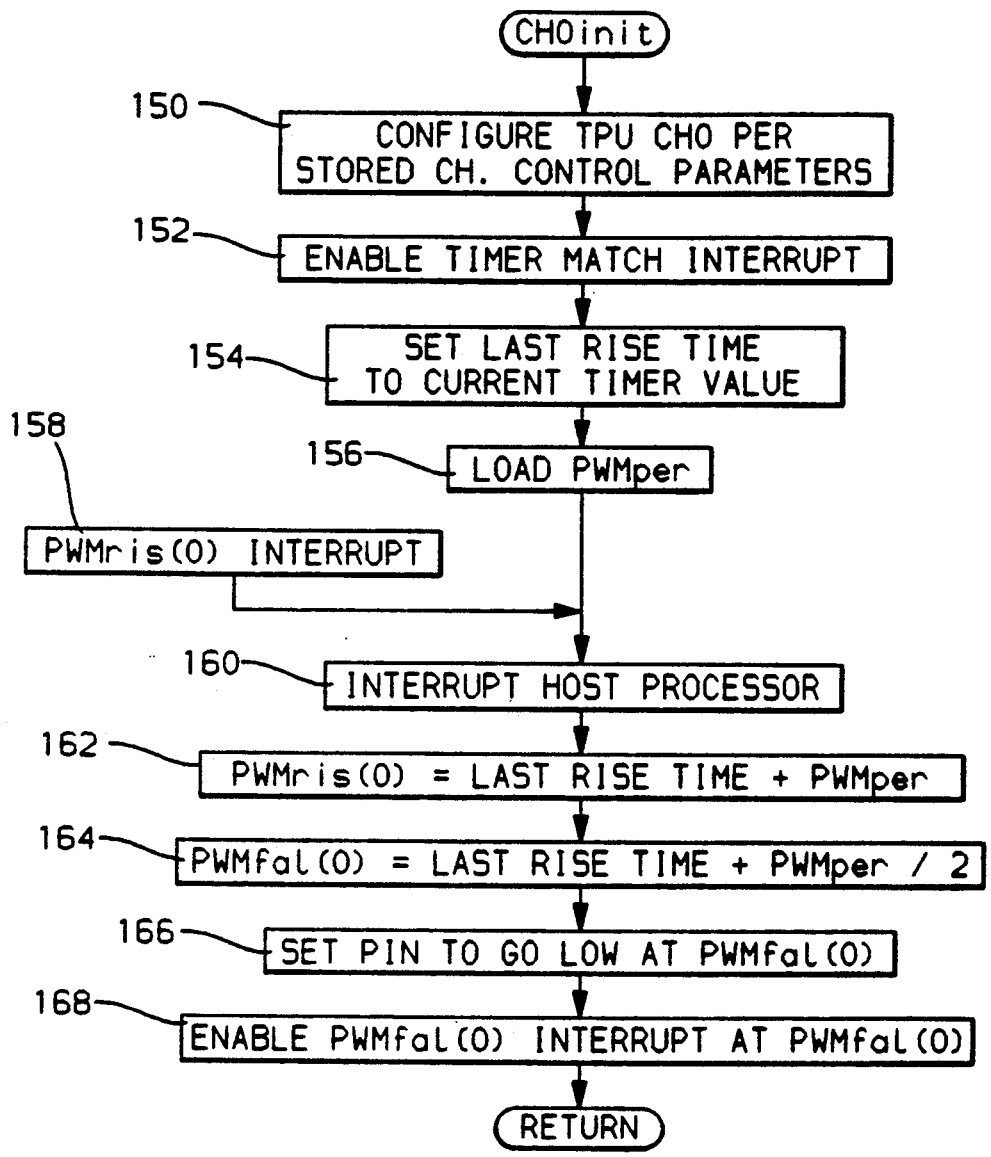
Figure 5B:
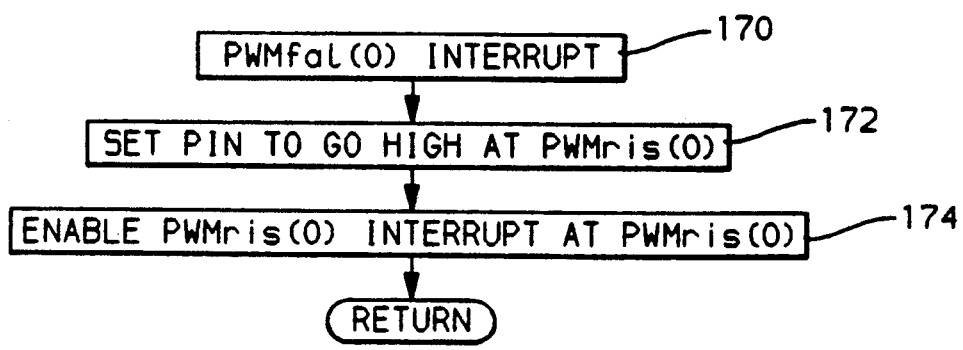

The flow diagrams of FIGS. 5a-5b detail the timer channel CH0 routines executed by the TPU in response to interrupts generated by the HOST CPU and the channel CH0 timers. As indicated above, the timer channel CH0 develops the SYNC signal graphically depicted in FIG. 3a. At system initialization, the TPU executes the blocks 150-156 in response to the CH0init instruction of the HOST CPU (block 102 of FIG. 4a). This involves setting the initial output condition of the channel (block 150), configuring the channel to generate an interrupt when the TPU timer matches a count stored in the channel register (block 152), setting LAST RISE TIME to the current TPU timer value (block 154) and loading the PWM period PWMper (block 156).

Following initialization, and at each subsequent rising edge PWMris(0) of the SYNC signal (as designated by block 158), the block 160 is executed to interrupt the HOST CPU, and the blocks 162-168 are executed to compute the next falling and rising edges PWMfal(0) and PWMris(0) based on the LAST RISE TIME and PWMper. The HOST CPU interrupt of block 160 causes the HOST CPU to execute the interrupt service routine of FIGS. 4b, 4c and 4e as described above for updating the on-time data stored in the timer channels CH1-CH3. The block 162 sets next rising edge time PWMris(0) to (LAST RISE TIME +PWMper). The block 164 sets the next falling edge time PWMfal(0) to (LAST RISE TIME +PWMper/2). Blocks 166-168 configure the channel CH0 to undergo a high-to-low logic level transition and to generate a PWMfal(0) interrupt when the TPU timer reaches PWMfal(0).

when the PWMfal(0) interrupt occurs at TPU timer =PWMfal(0), the TPU executes the interrupt service routine of FIG. 5b (block 170). At this time, the blocks 172-174 are executed to configure the channel CH0 to undergo a low-to-high logic level transition and to generate a PWMris(0) interrupt when the TPU timer reaches PWMris(0). The PWMris(0) interrupt, in turn, is serviced at block 158 by the execution of blocks 160-168 as described above.

Figure 6A:
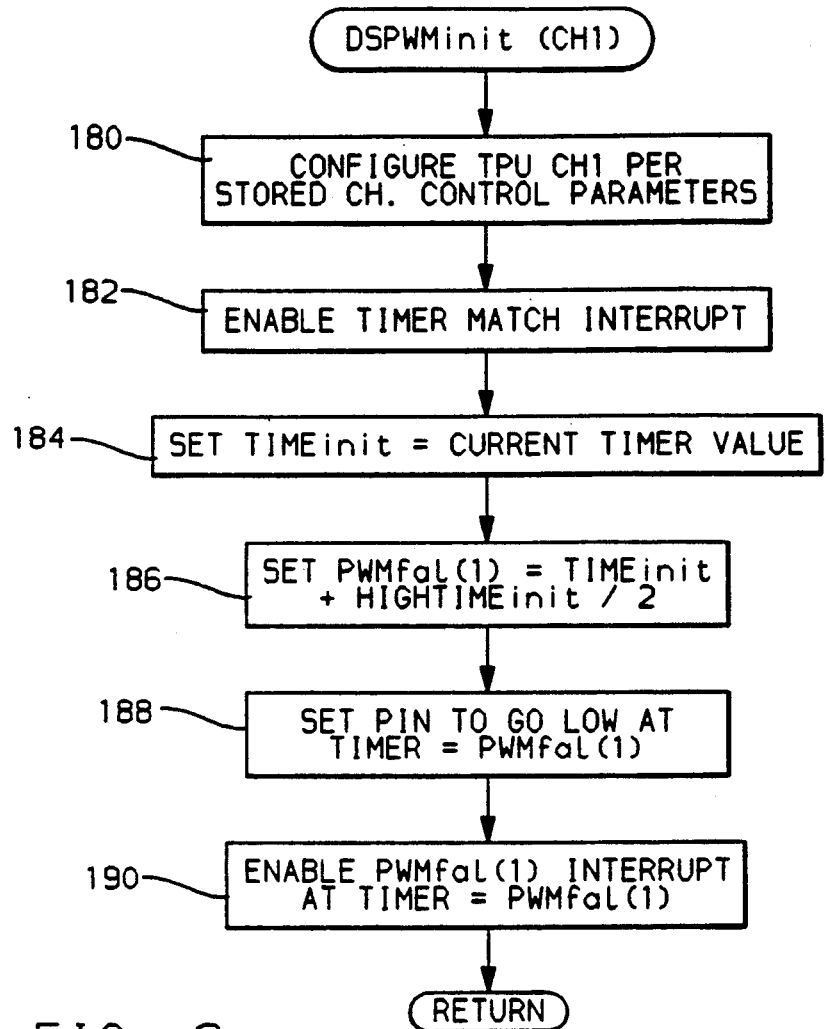
FIGS. 6a–6c depict flow diagrams representative of computer program instructions executed by the timer processor of FIG. 1 in the generation of the PWM waveform of FIG. 3b.

In a similar manner, the TPU timer channels CH1, CH2 and CH3 develop PWM control signals PWM1, PWM2 and PWM3 for the three phases of machine 10. The flow diagrams of FIGS. 6a-6c detail the generation of the control signal PWM1 by TPU timer channel CH1, it being understood that the timer channels CH2 and CH3 operate in like manner. As with the SYNC signal channel CH0, the control signal channels CH1-CH3 are each initialized by the HOST CPU at system start-up, and thereafter generate rising edge and falling edge interrupts to compute the timing of the next logic transition, based in this case on the updated on-time data HIGHTIME and the computed rising edge PWMris(0) of the SYNC signal. FIG. 6a details the initialization routine, FIG. 6b details the falling edge PWMfal(1) interrupt service routine, and FIG. 6c details the rising edge PWMris(1) interrupt service routine.

In response to the HOST CPU generated initialization interrupt CH1init (block 102, FIG. 3a), the TPU executes the interrupt service routine of FIG. 6a. This involves setting the initial output condition of the channel (block 180), configuring the channel to generate an interrupt when the TPU timer matches a count stored in the channel register (block 182), and setting the initial time TIMEinit to the current TPU timer value (block 184). In addition, block 186 computes the next fall time PWMfal(1) according to the sum (TIMEinit +HIGHTIMEinit/2), where HIGHTIMEinit is an initial predetermined on-time such as 50% of the PWM period PWMper. Finally, the blocks 188-190 configure the channel CH1 to undergo a high-to-low logic level transition and to generate a PWMfal(1) interrupt when the TPU timer reaches the PWMfal(1) value computed at block 186.

As indicated at block 102 of FIG. 4a, the foregoing initialization instructions are executed just after the SYNC channel initialization instructions. This results in an initial synchronization of the control signal on-periods with the rising edge PWMris(0) of the SYNC channel CH0. In subsequent operation, as explained below, the pulse centered synchronization is maintained by control signal channels CH1-CH3 by computing the respective rise and fall times based on the rising edge PWMris(0) computed at block 162 of the PWMris(0) interrupt service routine of FIG. 5a.

Figure 6C:
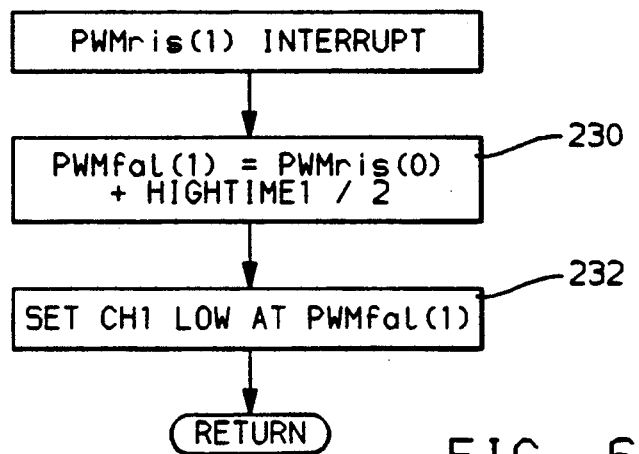
Figure 6B:
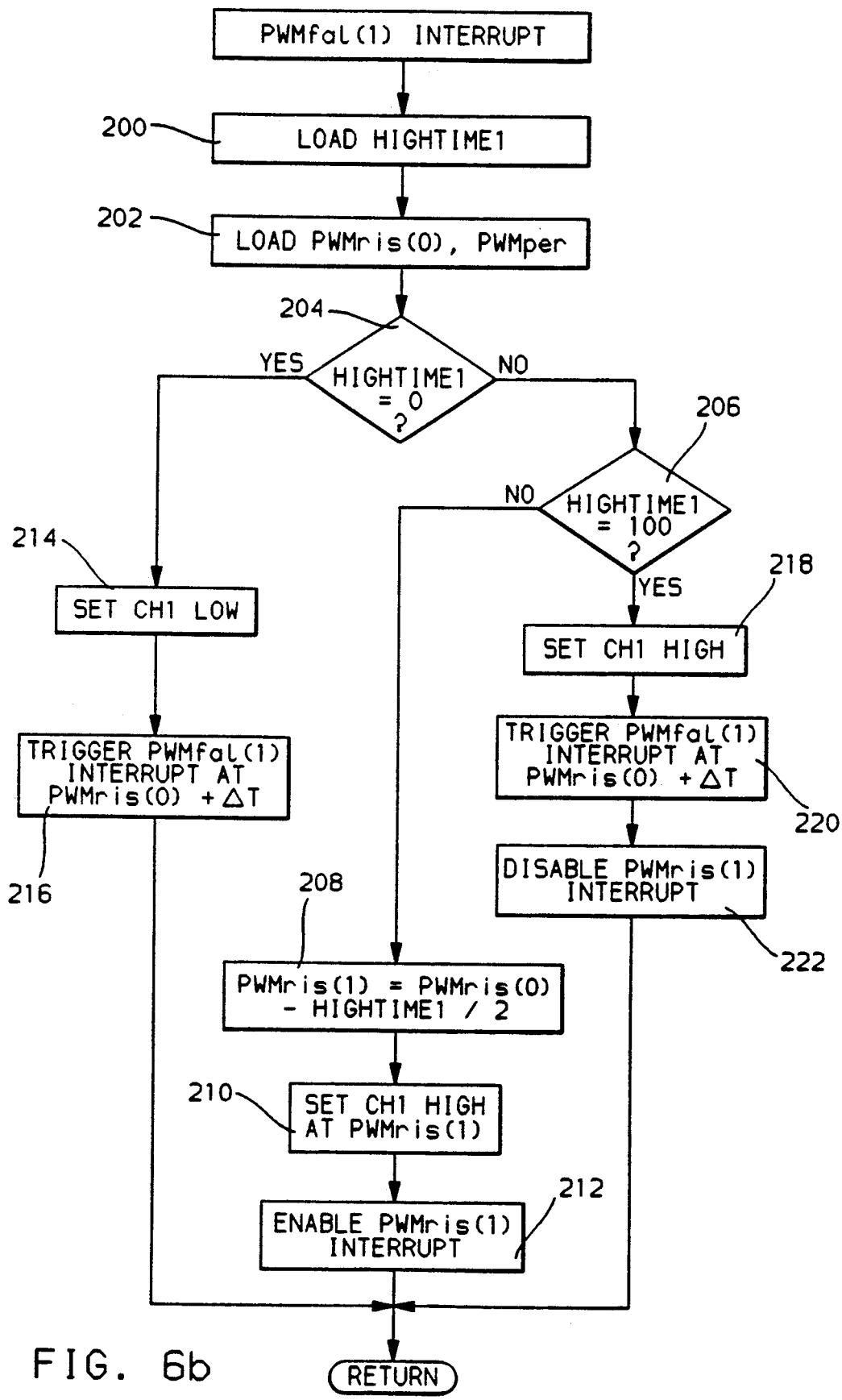

Referring to the PWMfal(1) interrupt service routine of FIG. 6b, the blocks 200 and 202 are first executed by the TPU to load the updated on-time data HIGHTIME1 from the timer channel register, and to load the SYNC channel rise time PWMris(0) and PWM period PWMper from the timer channel CH0. Decision blocks 204 and 206 determine if HIGHTIME1 is at its minimum or maximum level (HIGHTIME1 =0 or HIGHTIME1 =100). If not, the block 208 is executed to set the next rising edge PWMris(1) to (PWMris(0)-HIGHTIME1/2). This corresponds to [t5-(t6-t4)/2] in FIGS. 3a-3b. Then, the blocks 210-212 are executed to configure the channel CH1 to undergo a low-to-high logic level transition and to generate a PWMris(1) interrupt when the TPU timer reaches the PWMris(1) value computed at block 208.

If HIGHTIME1 =0, as determined at block 204, the blocks 214-216 are executed in lieu of the blocks 208-212. The block 214 forces the channel CH1 control signal to a low logic level, and the block 216 configures the channel CH1 to generate a PWMfal(1) interrupt shortly after the TPU timer reaches the rising edge PWMris(0) of the SYNC channel CH0. It will be recalled that the on-time data HIGHTIME1 is updated at PWMris(0), and the block 216 schedules the next channel CH1 interrupt to occur shortly thereafter in order to determine if the HIGHTIME1 =0 condition is still in effect. If so, the control signal will be held low by block 214; if not, the next rising edge PWMris(1) will be scheduled by blocks 208-212.

In similar manner, if HIGHTIME1=100, as determined at block 206, the blocks 218-222 are executed in lieu of the blocks 208-212. The block 218 forces the channel CH1 control signal to a high logic level, and the block 220 configures the channel CH1 to generate a PWMfal(1) interrupt shortly after the TPU timer reaches the rising edge PWMris(0) of the SYNC channel CH0. As with the HIGHTIME1=0 condition described above, this permits the TPU to determine if the HIGHTIME1=100 condition is still in effect. If so, the control signal will be held high by block 218; if not, the next rising edge PWMris(1) will be scheduled by blocks 208-212. The block 222 serves to disable the generation of a PWMris(1) interrupt due to the forced logic level transition.

When the TPU timer matches the PWMris(1) value computed at block 208, the TPU executes blocks 230-232 of the PWMris(1) interrupt service routine of FIG. 6c. This involves setting the next falling edge PWMfal(1) to (PWMris(0)+HIGHTIME1/2), and configuring the channel CH1 to undergo a high-to-low logic level transition when the TPU timer reaches the computed PWMfal(1) value.

In the above-described manner, the control of the present invention automatically adjusts multiple phase winding currents in a balanced fashion, while measuring only a single phase winding current. While described with respect to the illustrated embodiment, it is expected that various modifications to the disclosed control will occur to those skilled in the art. For example, the stored hightime data may be nonsinusoidal, or may comprise less than a full 360 degrees of STATOR ANGLE rotation. In this regard, it will be understood that controls incorporating these and other modifications may fall within the scope of this invention, which is defined by the appended claims.

The embodiments of the invention in which an exclusive property or privilege is claimed are defined as follows:

1. In a control system for a multiple phase winding AC machine including a control unit having a table of stored instantaneous current commands for each of said multiple phase windings based on an amplitude signal indicative of a desired current amplitude for said machine, a method of operation for said control unit comprising the steps of:

obtaining from said table an instantaneous current command for one of sad phase windings based on said amplitude signal;

forming an error signal based on a comparison of the instantaneous current command obtained from said table with a measure of instantaneous current in said one phase winding;

modifying said amplitude signal in accordance with said error signal to form a closed-loop amplitude signal;

obtaining from said table a set of instantaneous current commands for each of said phase windings, based on said closed-loop amplitude signal; and applying a source of direct current to said phase windings in accordance with conduction control signals based on said set of instantaneous current commands.

2. Control apparatus for a multiple phase winding AC machine, comprising:

a look-up table of instantaneous current commands for each of said multiple phase windings stored as a function of an amplitude signal indicative of a desired current amplitude for said machine;

inverter means for controlling application of a source of direct current to said phase windings in accordance with conduction control signals;

means for obtaining from said look-up table an instantaneous current command for one of said phase windings based on said amplitude signal;

means for measuring instantaneous current in said one phase winding;

means for forming an error signal based on a comparison of the instantaneous current command obtained from said look-up table with said measured instantaneous current;

means for modifying said amplitude signal in accordance with said error signal;

means for obtaining from said look-up table a set of instantaneous current commands for each of said phase windings based on said modified amplitude signal; and means for developing the conduction control signals for said inverter means based on said set of instantaneous current commands.

3. Control apparatus for a multiple phase winding AC machine, comprising:

a look-up table of pulse-width-modulation (PWM) on-times for each of said phase windings stored as a function of an amplitude signal indicative of a desired current amplitude for said machine and a stator angle signal indicative of a desired magnetic field orientation of said phase windings, the on-times being chosen to produce a predetermined current waveform having the desired current amplitude in the respective phase windings;

inverter means for modulating the application of a DC source to said phase windings in accordance with conduction control signals;

means for retrieving from said look-up table a PWM on-time for one of said phase windings based on said amplitude and stator angle signals to form a current command signal;

means for measuring a phase winding current in said one phase winding and scaling said measured current for comparison with said current command signal;

means for forming an error signal based on a comparison of the current command signal with the scaled measured current;

means for modifying said amplitude signal in accordance with said error signal;

means for retrieving from said look-up table PWM on-times for each of said phase windings based on said stator angle signal and the modified amplitude signal, and for developing the conduction control signals for said inverter means based on such retrieved PWM on-times.

* * * * *